US006380657B1

(12) United States Patent
Roth

(10) Patent No.: US 6,380,657 B1
(45) Date of Patent: Apr. 30, 2002

(54) LOW WEIGHT AND LOW EXCITATION FORCE MAGNETOTORQUER

(75) Inventor: Yossef Roth, Givatyim (IL)

(73) Assignee: Israel Aircraft Industries Ltd., Lod (IL)

( * ) Notice: Subject to any disclaimer, the term of this patent is extended or adjusted under 35 U.S.C. 154(b) by 0 days.

(21) Appl. No.: 09/336,794

(22) Filed: Jun. 21, 1999

(30) Foreign Application Priority Data

Jul. 1, 1998 (IL) ................................................ 125174
Sep. 15, 1998 (IL) ................................................ 126210

(51) Int. Cl.[7] ................................................ H02K 1/00
(52) U.S. Cl. ....................................... 310/254; 310/181
(58) Field of Search ................................ 310/254, 181; 324/244, 260, 33

(56) References Cited

U.S. PATENT DOCUMENTS

| | | | | | |
|---|---|---|---|---|---|
| 399,403 | A | * | 3/1889 | Higham | 310/254 |
| 3,400,328 | A | * | 9/1968 | Penn et al. | 324/244 |
| 3,667,035 | A | * | 5/1972 | Slichter | 324/303 |
| 3,725,705 | A | | 4/1973 | Borinski | 310/308 |
| 3,731,752 | A | * | 5/1973 | Schad | 175/45 |
| 3,766,787 | A | * | 10/1973 | Irvine | 73/514.02 |
| 4,114,841 | A | * | 9/1978 | Muhlfelder et al. | 244/166 |
| 4,117,602 | A | * | 10/1978 | Lapeyre | 33/352 |
| 4,157,495 | A | * | 6/1979 | Grover et al. | 324/302 |
| 4,458,248 | A | * | 7/1984 | Lyasko | 343/719 |
| 4,617,516 | A | * | 10/1986 | Schenck | 324/318 |
| 4,661,753 | A | * | 4/1987 | McBrien et al. | 318/689 |
| 4,746,085 | A | * | 5/1988 | Bruderle | 244/166 |
| 4,939,459 | A | * | 7/1990 | Akachi et al. | 324/247 |
| 5,220,339 | A | * | 6/1993 | Matsushita | 343/788 |
| 5,289,129 | A | * | 2/1994 | Joseph | 324/318 |
| 6,121,770 | A | * | 9/2000 | Sudo | 324/244 |

FOREIGN PATENT DOCUMENTS

| | | | | |
|---|---|---|---|---|
| EP | 0671323 | A | * | 9/1995 |
| EP | 0777127 | A2 | * | 6/1997 |
| EP | 0969485 | A2 | * | 1/2000 |
| FR | 1209196 | | | 2/1960 |
| FR | 1290779 | | | 9/1962 |
| FR | 1329084 | | | 12/1963 |
| FR | 2718105 | | | 10/1995 |
| GB | 1042077 | | | 9/1966 |

OTHER PUBLICATIONS

Bozorth, R.M. et al. "Demagnetizing Factors of Rods." Journal of Applied Physics, vol. 13 (1942 pp. 320–326.
Cambridge Aerospace Series, "Spacecraft Dynamics and Control", by Marcel J. Sidi, p. 397–398 (before 1998).
Bird, M. D., et al. "Design and Construction of 12–MW Magnets at the NHMFL."
IEEE Transactions on Magnetics, vol. 30, No. 4 (1994) pp. 2200–2203.
English Summary of FR 1290779 Dated Sep. 7, 1962.
English Summary of FR 1329084 Dated Dec. 16, 1963.
English Summary of FR 1209196 Dated Feb. 29, 1960.

* cited by examiner

*Primary Examiner*—Elvin Enad
*Assistant Examiner*—Joseph Waks
(74) *Attorney, Agent, or Firm*—Ladas & Parry

(57) ABSTRACT

A magnetotorquer including a ferromagnetic core with an excitation coil more compacted around at its central portion than at at least one of its lateral portions. A magnetotorquer including ferromagnetic core with an excitation coil wound therealong, the core having a central portion intermediate to lateral portions, at least one lateral portion having a smaller material cross section area than the central portion.

20 Claims, 5 Drawing Sheets

LOW WEIGHT AND LOW EXCITATION FORCE MAGNETOTORQUER

FIELD OF THE INVENTION

The invention is in the field of magnetotorquers particularly suitable for use in earth orbiting satellites for steering and stabilization purposes.

BACKGROUND OF THE INVENTION

A magnetotorquer hereinafter referred to a "MTQ" has a ferromagnetic core with an excitation coil wound therealong through which a current passes for generating a total magnetic dipole M for imparting a torque T given by the vector product of $\overline{T}=\overline{M}\times\overline{B}_{earth}$.

The total magnetic dipole M is derived as follows:

$$M = \frac{1}{\mu_0}\int_v BdV \approx \mu \cdot n \cdot I \cdot V$$

where $\mu_0$ is the permeability of free space, B is the local flux density, $\mu$ is the effective permeability, n-I is defined as the excitation force and is the product of the number of windings per total core length n and the excitation current I, and V is the core's volume.

A convention MTQ has a right cylindrical core with an excitation coil uniformly wound therealong and whose distribution of the total magnetic flux $\phi$ therealong is characterized by a maximum flux density value at its core's center and a flux density value of less than 2% of the maximum value at its core's ends.

SUMMARY OF THE INVENTION

In accordance with a first aspect of the present invention, there is provided a magnetotorquer comprising a ferromagnetic core with an excitation coil more compacted at its central portion than at at least one of its lateral portions.

Compacting the MTQ's excitation coil at its central portion increases the local flux density thereat in comparison to a conventional MTQ assuming the same excitation force. The advantage afforded thereby is that the same total magnetic dipole can be obtained with a smaller excitation force effected by either a smaller current consuming less power or less windings which weigh less.

In accordance with a second aspect of the present invention, there is provided a magnetotorquer comprising a ferromagnetic core with an excitation coil wound therealong, said core having a central portion intermediate to lateral portions, at least one lateral portion having a smaller material cross section area than said central portion.

Reducing the material cross section area of preferably both of a core's lateral portions has the effect of increasing the local flux density thereat in comparison to a conventional MTQ assuming the same excitation coil and excitation force without, however, reducing its total magnetic dipole. The advantage afforded thereby is that material can be removed from the core thereby reducing its overall weight.

BRIEF DESCRIPTION OF THE DRAWINGS

In order to understand the invention and to see how it may be carried out in practice, preferred embodiments will now be described, by way of non-limiting examples only, with reference to the accompanying drawings, in which.

DETAILED DESCRIPTION OF THE DRAWINGS

Figure 1:
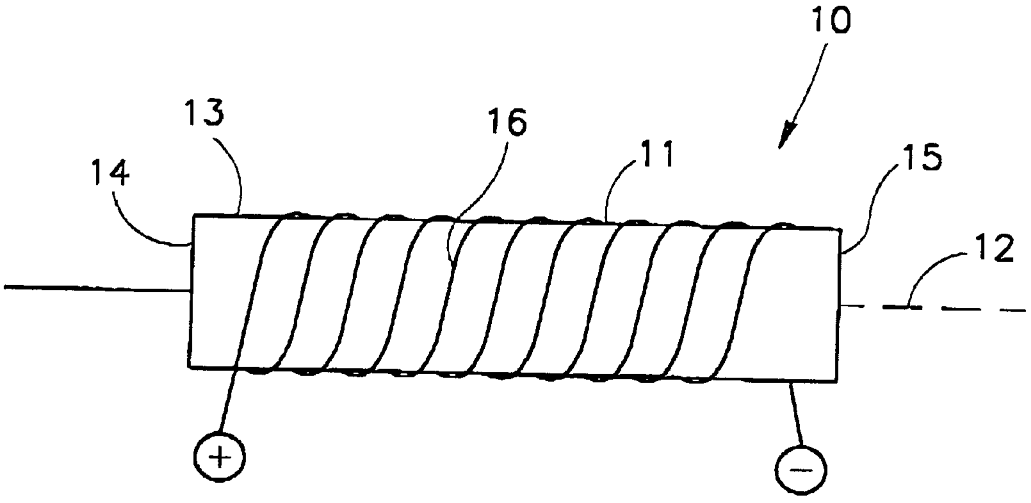
FIG.1 PRIOR ART
FIGS. 1 and 2 are respectively a front view of a conventional MTQ and a flux density vs. length graph therefor.

FIG. 1 shows a convention MTQ 10 having a right cylindrical solid ferromagnetic core 11 with a longitudinal axis 12, a peripheral surface 13 and end surfaces 14 and 15 and an excitation coil 16 uniformly wound therealong and connected to an external power source (not shown).

Figure 2:
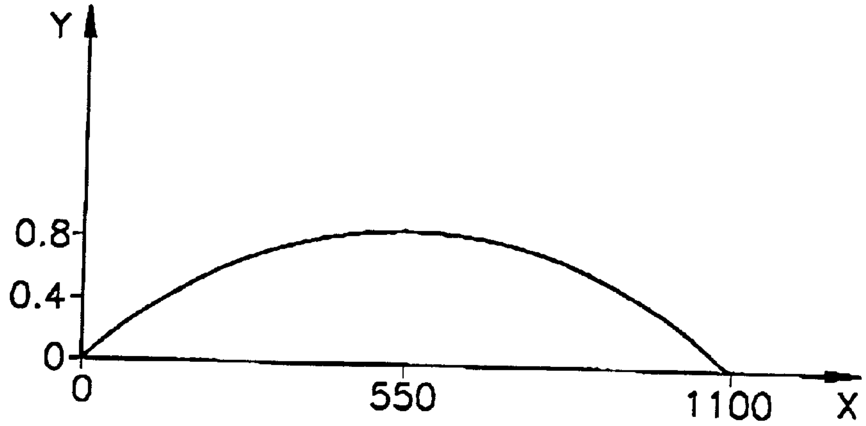
FIG.2 PRIOR ART

FIG. 2 shows the flux density vs. length graph for the MTQ 10 having the following specification: length 1090 mm, diameter 35.2 mm, excitation force 2500 Amp for generating a total magnetic dipole of 515 $Am^2$.

Figure 3:
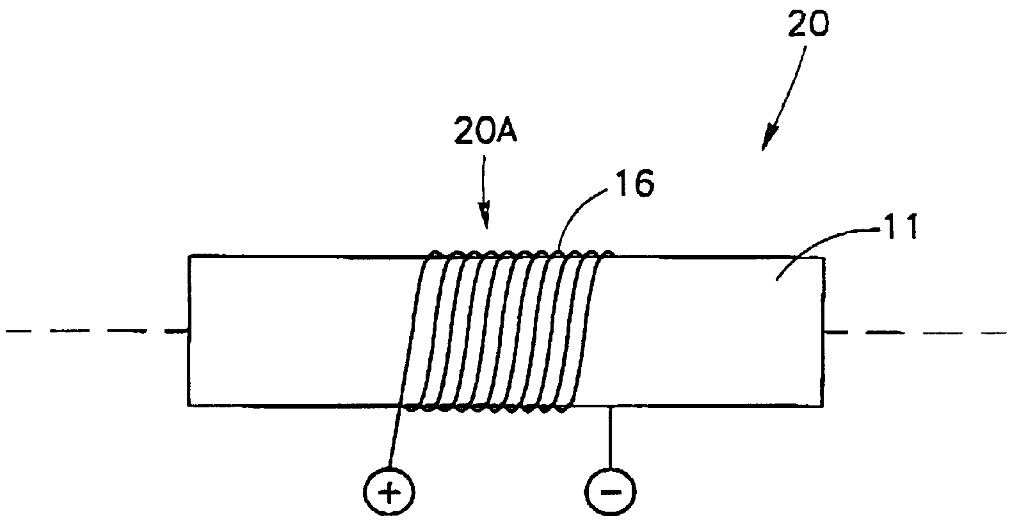
FIGS. 3 and 4 are respectively a front view of a first embodiment of an MTQ in accordance with the present invention and a flux density vs. length graph therefor superimposed on the graph of FIG. 2.
Figure 4:
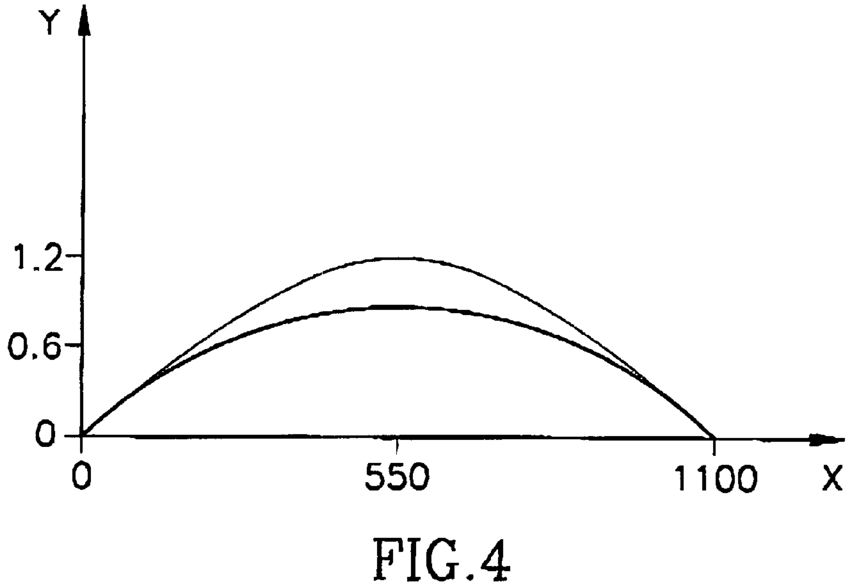

FIG. 3 shows an MTQ 20 similar to the MTQ 10 except that is excitation core 16 is compacted along a central portion 20A extending along half its length whereby its central portion 20A has a higher local flux density than the MTQ 10's central portion. The MTQ 20 can generate with the same excitation force as MTQ 10, a 30% higher total magnetic dipole of 660 $Am^2$.

Figure 5:
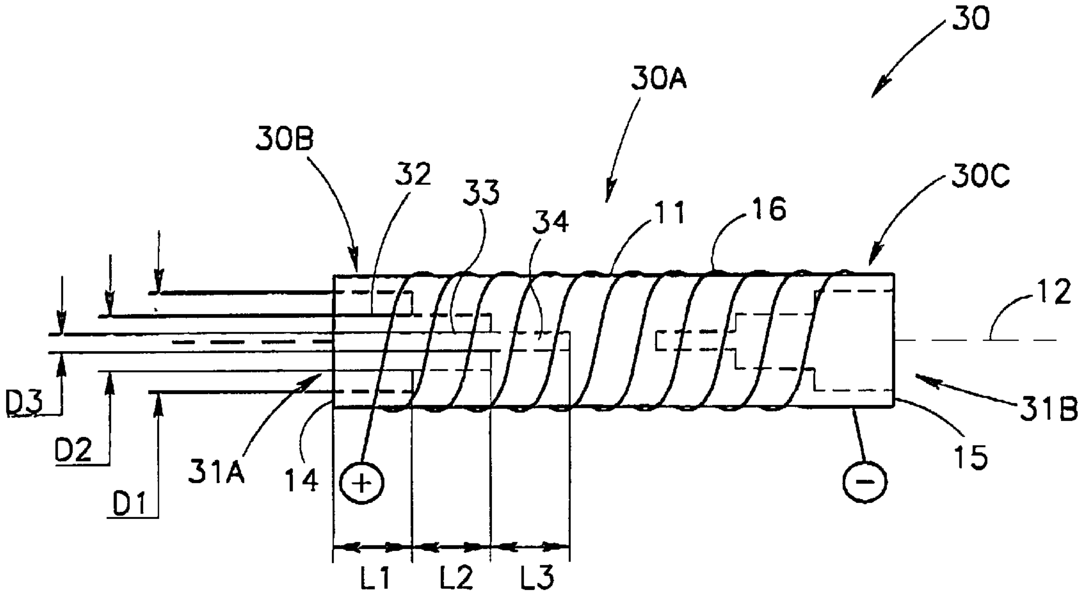
FIGS. 5 and 6 are similar to FIGS. 3 and 4 in respect of a second embodiment of an MTQ in accordance with the present invention.
Figure 6:
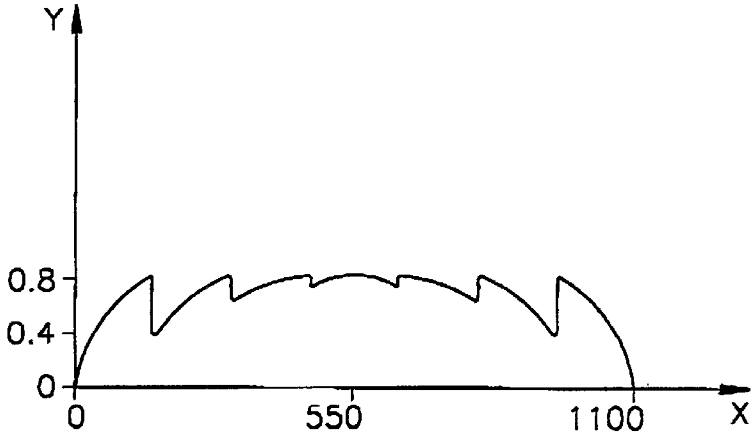

FIG. 5 shows an MTQ 30 similar to the MTQ 10 except that it has a central portion 30A and hollow lateral portions 30B and 30C. The lateral portions 30B and 30C have longitudinal directed stepped bores 31A and 31B respectively extending inwardly from the end surfaces 14 and 15. Each stepped bore 31 has an outer portion 32 of length $l_1$=136 mm and diameter $d_1$=28 mm, and intermediate portion 33 of length $l_2$=137 mm and diameter $d_2$=19.5 mm and an inner portion 34 of length $l_3$=136 mm and diameter $d_3$=8.5 mm. Thus, the solid central portion 30A has a material cross section area of 945 $mm^2$, the outer bore portion 32 has a material cross section area of 358 $mm^2$, the intermediate bore portion 33 has a material cross section area of 674 $mm^2$ and the inner bore portion 34 has a material cross section area of 902 $mm^2$. The MTQ 30 can generate the same total magnetic dipole as MTQ 10, however, with 25% less weight.

While the invention has been described with respect to a limited number of embodiments, it can be appreciated that many variations, modifications and other applications of the invention may be made without departing from the scope of the claims appended hereto.

For example, an excitation coil can be compacted along a core's central portion extending along between about 30% to about 70% of its length.

Figure 7:
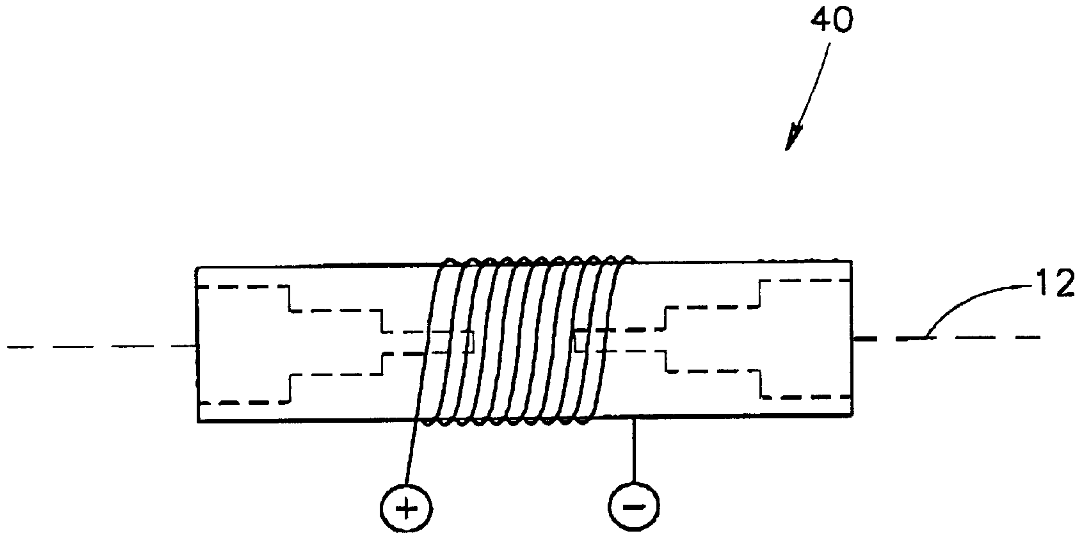
FIGS. 7 and 8 are similar to FIGS. 3 and 4 in respect of a third embodiment of an MTQ in accordance with the present invention.
Figure 8:
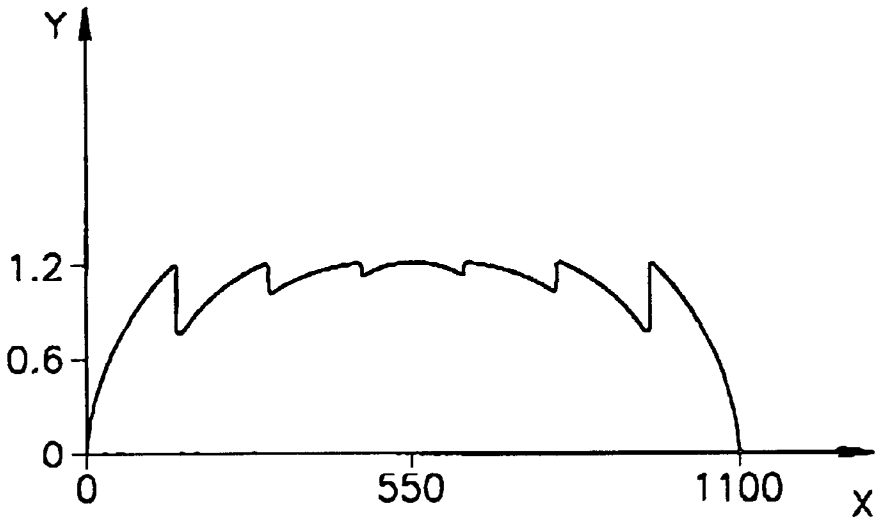

Also, the features of MTQ 20 and MTQ 30 can be combined in an MTQ 40 (see FIG. 7) which can generate the same total magnetic dipole as MTQ 20, however, with the weight of MTQ 30.

Figure 9:
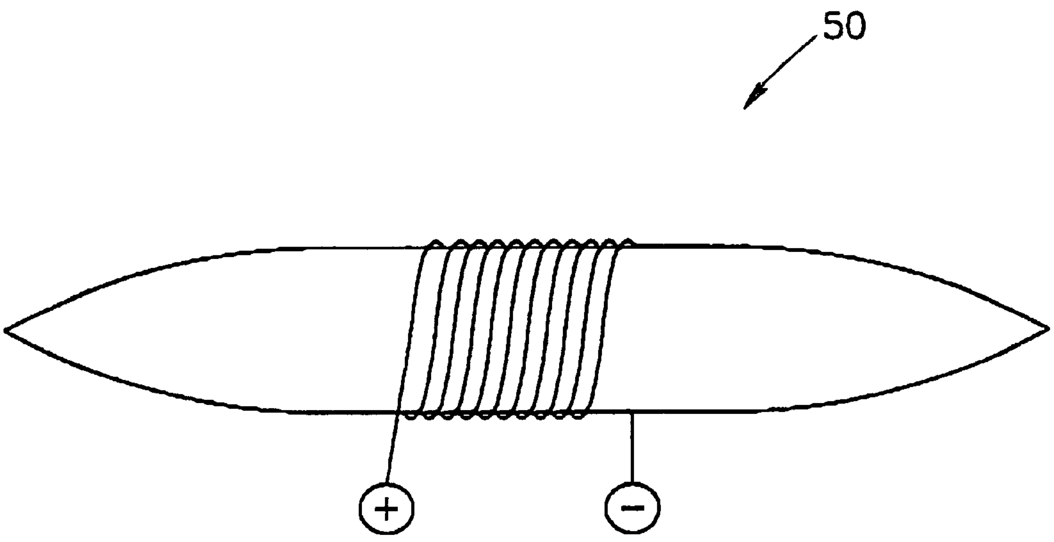
FIGS. 9 and 10 are front views of additional embodiments of an MTQ in accordance with the present invention.
Figure 10:
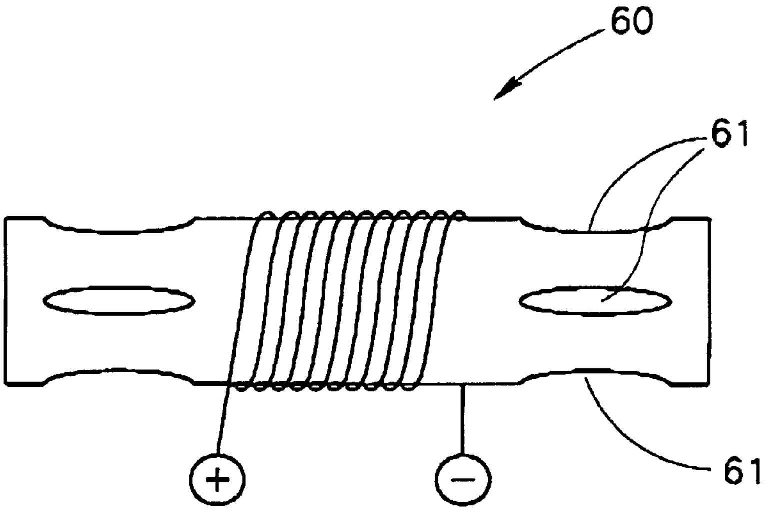

In addition, removal of material can be effected by either taping the lateral portions of an MTQ 50 (see FIG. 9) or forming recesses 61 in the peripheral surface of the lateral portions of an MTQ 60 (see FIG. 10).

What is claimed is:

1. A magnetotorquer construction comprising a ferromagnetic core having a central portion and lateral portions, said lateral portions having a material cross-section area not exceeding a cross-section area of said central portion and an excitation coil wound on said core and more compacted around at said central portion than at at least one of said lateral portions.

2. The magnetotorquer construction according to claim 1 wherein said core has a length and said central portion constitutes between about 30% to about 70% of the length of said core.

3. The magnetotorquer construction according to claim 1 wherein said core has at least one of said lateral portions with a smaller material cross section area than said central portion.

4. The magnetotorquer construction according to claim 3 wherein at least one of said lateral portions has a longitudinal inwardly directed bore.

5. The magnetotorquer construction according to claim 3 wherein said at least one of said lateral portions tapers towards a free end thereof.

6. The magnetotorquer construction according to claim 3 wherein at least one of said lateral portions has a peripheral surface formed with one or more recesses.

7. The magnetotorquer construction according to claim 1, wherein said excitation coil is more compacted around said central portion than around both said lateral portions.

8. A magnetotorquer construction comprising a magnetotorquer including a ferromagnetic core with an excitation coil wound therealong, said core having a central portion and two lateral portions, said lateral portions having a material cross-section area not exceeding a cross-section area of said central portion at least one of said lateral portions having a smaller material cross section area than said central portion.

9. The magnetotorquer construction according to claim 8 wherein said excitation coil is substantially compacted at said central portion.

10. The magnetotorquer construction according to claim 9 wherein said core has a length and said central portion constitutes between about 30% to about 70% of the length of said core.

11. The magnetotorquer construction according to claim 8 wherein at least one of said lateral portions has a longitudinal inwardly directed bore.

12. The magnetotorquer construction according to claim 11 wherein said excitation coil is substantially compacted at said central portion.

13. The magnetotorquer construction according to claim 12 wherein said core has a length and said central portion constitutes between about 30% to about 70% of the length of said core.

14. The magnetotorquer construction according to claim 8 wherein at least one of said lateral portions tapers towards a free end thereof.

15. The magnetotorquer construction according to claim 14 wherein said excitation coil is substantially compacted at said central portion.

16. The magnetotorquer ceonstruction according to claim 15 wherein said core has a length and said central portion constitutes between about 30% to about 70% of the length of said core.

17. The magnetotorquer construction according to claim 8 wherein said at least one of said lateral portions has a peripheral surface formed with one or more recesses.

18. The magnetotorquer construction according to claim 17 wherein said excitation coil is substantially compacted at said central portion.

19. The magnetotorquer construction according to claim 18 wherein said core has a length and said central portion constitutes between about 30% to about 70% of the length of said core.

20. The magnetotorquer construction according to claim 8, wherein both said lateral portions have a smaller material cross section area than said central portion.

* * * * *